Patented July 10, 1951

2,560,462

UNITED STATES PATENT OFFICE 2,560,462

WATER-SOLUBLE TETRACENE DYESTUFFS AND METHOD OF DYEING EMPLOYING THEM

Charles Marschalk and Jean Paul Niederhauser, Creil, France, assignors to Societe Anonyme de Matieres Colorantes et Produits Chimiques Francolor, Paris, France, a corporation of France No Drawing. Application May 29, 1947, Serial No. 751,460. In France June 12, 1946

9 Claims. (Cl. 8—1)

It is well known that unvattable green pigments containing sulphur can be obtained by the action of sulphur on tetracene advantageously in the presence of solvents indifferent to sulphur (see Charles Marschalk—Bull. (5), 6, (1939), pp. 931 and 1122). Said pigments can also be obtained through the action of sulphur chloride on tetracene or of sulphur on halogenated derivatives of this hydrocarbon. They contain solely the elements C, H and S and correspond to the rough formula $C_{18}H_8S_4$. The four sulphur atoms are fixed to the carbon atoms 9-10-11 and 12 of the tetracenic nucleus

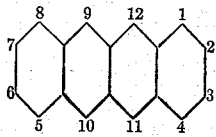

Said green pigments are designated hereafter under the name of "sulphuretted tetracene."

Now, we have found that new dyestuffs having a saline character can be obtained by fixation of one or more anions onto the molecule of sulphuretted tetracene.

This fixation may be obtained in practice in various manners.

Thus, a halogen may be caused to act upon sulphuretted tetracene, the fixation then occurring through a simple addition.

An acid and an oxidizing agent such as, for example, $PbO_2$, $MnO_2$, or $H_2O_2$ may be caused jointly to act upon sulphuretted tetracene; when containing oxygen and used in a concentrated condition the acid may itself form the oxidizing medium.

Salts which readily free anions such as, for example, salts of noble metals such as silver and the so-called "holoquinoid" salts of organic bases may also be caused to act upon sulphuretted tetracene.

Finally, an ester of a mineral acid may be caused to act upon sulphuretted tetracene. The fixation of an anion mentioned above will hereinafter be referred to by the expression oxidizing salification. Many colored salts are obtainable from colorless products which are generally designated as leucobases by the combined action of an acid and an oxidizing agent. Thianthrene which comes closest by virtue of its constitution to tetrathiotetracene was regarded by Fries and Engelbertz (Ann. 407 P. 206) as a leucobase, and it actually acts in the same manner. It is only distinguished by its initial green coloration. All the methods which make it possible to convert leucobases into salts occur in an acid medium and may be designated by the general term of "oxidizing salification."

According to modern conceptions of theoretical chemistry any oxidation consists in an elimination of electrons or a reduction in the supply of electrons. Therefore any method which leads to an elimination of electrons must be regarded as an oxidation method. All of the organic salts formed by the present method from tetrathiotetracene are characterized by formulae which express the elimination of one or two electrons from the primary molecule. They all contain one or two anions fixed through electrovalence to the tetrathiotetracene cation and have all the characteristics of organic salts. These salts therefore are said to be the result of an oxidizing salification. The procedure is independent of the means, and it is therefore quite immaterial whether there is a combined action of an acid and an oxidizing agent or a direct fixation of a halogen or a transfer from a giver to an accepter of anions. All of these means fall under the modern definition of an oxidation process and the result is always an oxidizing salification.

The so obtained salts show, in a general manner, a solubility in water and a stability which is high enough for making it possible to use them as dyestuffs for direct dyeing in a neutral or slightly acid bath, or still for foularding or printing fabrics; said dyestuffs, which also form the subject matter of the present invention, have, more particularly, a remarkable affinity for natural or regenerated cellulose or for natural silk.

Furthermore, the salts obtained in accordance with the present invention can be split up on the fibre while giving rise to unvattable green pigments the appearance of which is not unlike that of the starting green pigments; said pigments are insensitive to weak acids and alkalies and are, owing to this fact, firmly fixed on the textile fibre. The obtained shades are very pure and fast to light and to washing. Said splitting up or development on the fibre may be effected by means of hydrolyzing agents such as, for instance, hot water or alkaline baths which generally lead to steely blue green pigments which are different from the starting pigments and contain oxygen, or by means of reducing agents such as, for instance, stannous chloride, titanium chloride, sulphur dioxide or hydrosulphite of sodium, which latter acts even at the ordinary temperature. These reducing agents lead to green pigments the appearance of which is quite comparable to that of the starting pigments.

As it is recommended to soap the dyeings after the development, both said operations may be combined into a single one by using, for instance, for performing said development, a boiling, slightly alkaline soap bath.

The saline substances obtained in the above mentioned manner from sulphuretted tetracene appear in the form of yellow salts or of red salts according to the strength of the reagents which are used.

An energetic action leads to yellow salts.

These latter are obtained, for instance, through the direct action of an excess of concentrated sulphuric, nitric or perchloric acids or through the combined action of a more diluted mineral acid and of an excess of oxidizing agent. Under these conditions, formic and trichloracetic acids also give yellow salts.

The latter also form under the action of an excess of chlorine or bromine upon a suspension of sulphuretted tetracene in trichlorobenzene.

Experiments made with said yellow salts, more particularly on the yellow sulphate, perchlorate and chloride have shown that two anions were fixed on each tetracenic nucleus.

A more moderate action in order to fix a single anion on the sulphuretted tetracene leads to red salts.

Such is, for instance, the action of air upon suspensions of sulphuretted tetracene in diluted mineral acids ($SO_4H_2$, HCl and other similar acids) or trichloroacetic acid. Red salts form very readily under the action of a predetermined quantity of an oxidizing agent upon suspensions of sulphuretted tetracene in various diluted mineral acids or organic acids. The necessary quantity of active oxygen is near half an atom for each tetracene nucleus. Certain oxidizing agents, such as sodium nitrite, have a catalytic action which promotes the oxidation through the oxygen of air and may be used, consequently, in a very small quantity.

The so-called "holoquinoid" salts of organic bases also lead to red salts; the holoquinoid dinitrate derived from the dissymetric dimethyl-p.phenylene-diamine, for example, reacts very rapidly at the ordinary temperature upon a suspension of sulphuretted tetracene in methyl alcohol while giving a mixture of a red salt, which is very soluble in cold water and shows the characteristic spectrum of the Wurster red, and of another salt, which is nearly insoluble and behaves like a mononitrate of sulphuretted tetracene.

Silver sulphate acts very rapidly at the ordinary temperature upon an aqueous suspension of finely ground sulphuretted tetracene while giving a red salt which can be separated readily from the metallic silver through extraction with water at 50–60° C.

Among the red salts having the character of dyeing materials is also the product obtained through the action of the methyl sulphate upon the sulphuretted tetracene in a di- or trichlorobenzenic solution. It shows a very high resemblance to the red salts produced through acids in the presence of oxidizing agents and behaves likewise towards alkalies and reducing agents; alike the latter salts, it contains only one anion for each molecule of sulphuretted tetracene.

In a like manner as it is possible to pass from certain red salts to the yellow salts derived from the same acid through using an excess of oxidizing agent (case of the formiate, of the sulphate) it is also possible to pass from a yellow salt (di-bisulphate) to a red salt through hydrolysis or partial reduction.

It is also possible to obtain red salts by grinding together equimolecular quantities of a yellow salt and of sulphuretted tetracene with a small quantity of acetic acid. This reaction may also be realised in an aqueous medium. Then the yellow salt acts like a salt readily freeing an anion.

The red salts are preferably used for dyeing owing to their higher stability to hydrolysis.

In certain cases the yellow salts can be used directly for dyeing but they are then hydrolysed in the dyeing bath while giving, like the red salts, Bordeaux red shades which develop to green.

In the following examples illustrating the invention, the parts by weight and by volume designate any weight and volume units corresponding to the same quantity of water at 15° C.

Example I

One part by weight of finely divided sulphuretted tetracene is suspended in 25 parts by volume of sulphuric acid diluted to 45% of acid. One part by weight of lead dioxide is added progressively and after having stirred during 3 days it is diluted in 25 parts by volume of water. After washing and filtering with alcohol the obtained crystalline precipitate is dried in vacuo. The obtained yellow crystals dissolve in cold water and may be used directly in dyeing or printing.

It is also possible to heat a solution of these yellow crystals to 50° or 60° C. which causes the hydrolysis of the yellow sulphate; the stable sulphate which is insoluble in this acid medium separates as brown-red crystals. The obtained dyestuff is soluble in water at about 60° C.

Instead of lead dioxide, manganese dioxide or hydrogen peroxide may be used.

Example II

One part by weight of sulphuretted tetracene is dissolved in 15 parts by volume of concentrated sulphuric acid. The obtained yellow solution may be iced and diluted slowly in 500 parts by volume of cold water while avoiding a raising of the temperature; the same yellow crystals are then obtained as those described in Example I. The said yellow solution may also be poured into 500 parts by volume of cold water and then heated to 50°–60° C. till hydrolysis of the yellow sulphate is completed; the stable sulphate described in Example I is then obtained in the form of brown-red crystals.

Example III 1 part by weight of sulphuretted tetracene is dissolved in 10 parts by weight of 48° Bé. nitric acid at 0° C., then the obtained solution is poured on ice. A yellow precipitate is obtained which is filtered and washed with water rendered slightly acid with acetic acid till the nitric acid in excess is eliminated. The obtained crystalline yellow nitrate is dried at the ordinary temperature.

It readily dissolves in water while giving a yellow solution which is sufficiently stable for use in dyeing.

Dyeings on cotton are Bordeaux red.

In the above described preparation of the nitrate the nitric acid can be substituted by a mixture of said acid with a diluent such as, for example, glacial acetic acid.

Example IV 2 parts by weight of finely divided sulphuretted tetracene are suspended in 150 parts by weight of trichlorobenzene. A current of chlorine is bubbled through this suspension during 24 hours. The yellow salt which separates is filtered, washed with benzene and dried in vacuo. The composition corresponds to the global formula $(C_{18}H_8S_4)Cl_2$.

It dissolves in cold water while giving a yellow solution.

Under the action of bromine in excess a suspension of sulphuretted tetracene in trichlorobenzene is converted at the ordinary temperature into an orange-red crystalline powder.

*Example V*

1 part by weight of sulphuretted tetracene is dissolved in 20 parts by weight of trichloracetic acid heated to 70° C. A current of air is bubbled through this solution during 6 hours where after it is diluted in 30 parts by volume of water. After filtering and washing with water the precipitate is dried in vacuo.

The yield of the reaction is nearly quantitative.

The trichloracetate dissolves in water while giving a yellow solution.

*Example VI*

1 part by weight of sulphuretted tetracene is suspended in 50 parts by weight of hydrochloric acid with 18% of acid and stirred in the presence of air. The sulphuretted tetracene is converted little by little into red monochloride $(C_{18}H_8S_4)Cl$. After filtering and washing with water this product is dried in vacuo. The so prepared chloride contains one molecule of water which is loosed at 100° C. Not very soluble in cold water, it dissolves in water at 50° C. while giving a Bordeaux red solution.

The preparation of this red salt is largely facilitated through an addition of sodium nitrite acting as an oxidation catalyst. In the above described example the presence of 0.001 part by weight of $NO_2Na$ reduces the duration of the operation to 2 hours.

*Example VII*

10 parts by weight of finely ground sulphuretted tetracene are added to 200 parts by volume of acetic acid and the mixture is stirred. Then 3.4 parts by weight of lead dioxide are introduced little by little. After 24 hours, the precipitate which has formed is filtered, rinsed with acetic acid and dried in vacuo. Instead of $PbO_2$, $MnO_2$, $H_2O_2$ or air in the presence of $NO_2Na$ may be used.

The obtained monoacetate readily dissolves in cold water while giving a red solution.

*Example VIII*

1 part by weight of sulphuretted tetracene is dissolved in 50 parts by weight of dry trichlorobenzene, then 5 parts by weight of freshly distilled methyl sulphate are added to the boiling solution.

The green solution loses its colour rather rapidly and the addition product precipitates in the form of crystals appearing in a brown-red shade under the microscope.

After cooling, the precipitate is filtered and washed with alcohol or benzene.

*Example IX*

1 part by weight of sulphuretted tetracene is kneaded together with 1.5 parts by weight of the yellow sulphate obtained, for instance, as described in Example I in the presence of acetic acid. After half an hour both components of the reaction are entirely converted into a red sulphate. Said sulfate is diluted with acetic acid, the precipitate filtered and washed with cold water and then dried in vacuo.

It is also possible to obtain the red sulphate through a partial reduction of the yellow sulphate in solution by means of a reducing agent such as $TiCl_3$, for example.

This red salt, which is not very soluble in cold water, yields a red solution in water at 50° C.

The red nitrates and chlorides may be obtained in the same manner from the yellow nitrates and chlorides.

*Example X*

0.1 part in weight of the dyestuff prepared according to Example IV is pasted in 100 parts by volume of water containing 1% of acetic acid, and heated to 60° C.; when the dyestuff is dissolved, 5 parts by weight of cotton are introduced and dyed almost up to exhaustion at this temperature. Towards the end of the operation a small proportion of sodium sulphate may be added for completing the exhaustion of the bath.

The dyed cotton is rinsed and the dyestuff is developed by one of the following means:

(1) Introduction into a cold bath containing 0.4 part by weight of sodium hydrosulphite and 0.2 part by weight of sodium carbonate in 100 parts by volume of water. A green shade which is quite comparable to that of the sulphuretted tetracene is thus obtained on the fibre.

(2) Introduction into a boiling bath containing 4 grams of soap and 2 grams of $Na_2CO_3$ per litre. The shade obtained on the fibre is a green which is slightly more steely blue than the preceding one.

(3) Introduction into a bath containing 2 to 4 grams of $Na_2CO_3$ per litre at the temperature of 50 to 95° C. The obtained shade is the same as in the foregoing case.

In the present example cottom may be substituted by viscose or natural silk.

*Example XI*

In the foregoing example the product obtained in Example IV is substituted by the same weight of the product obtained in Example V. After development the same shades are obtained as in the foregoing example.

*Example XII*

In order to be foularded, a fabric is impregnated by means of a solution of one of the soluble dyestuffs according to the present invention; the fabric is then wrung and the dyestuff developed through one of the means described in Example X.

We claim:

1. The method for preparing water soluble basic dyestuffs which consists in subjecting an unvattable green pigment obtained by sulfuration of tetracene and having the general formula:

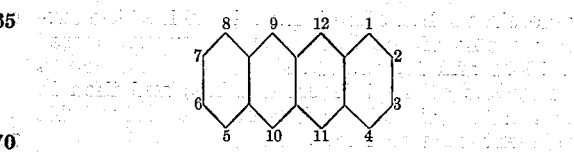

wherein a sulfur atom is fixed to each of the carbon atoms of the tetracenic nucleus numbered 9–10–11 and 12 to an oxidizing salification.

2. The method for preparing water soluble basic dyestuffs which consists in causing a halogen to act upon an unvattable green pigment obtained by sulfuration of tetracene and having the general formula:

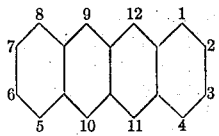

wherein a sulfur atom is fixed to each of the carbon atoms of the tetracenic nucleus numbered 9-10-11 and 12.

3. The method for preparing water soluble bisc dyestuffs which consists in causing, at a temperature below 100° C., an acid and an oxidizing medium to act upon an unvattable green pigment obtained by sulfuration of tetracene having the general formula:

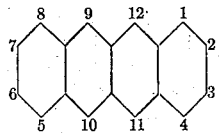

wherein a sulfur atom is fixed to each of the carbon atoms of the tetracenic nucleus numbered 9-10-11 and 12.

4. The method for preparing water soluble basic dyestuffs which consists in causing an oxidizing acid to act upon an unvattable green pigment obtained by sulfuration of tetracene and having the general formula:

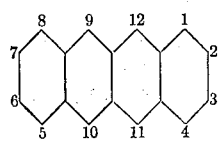

wherein a sulfur atom is fixed to each of the carbon atoms of the tetracenic nucleus numbered 9-10-11 and 12.

5. As a new product of manufacture, a water soluble basic dyestuff of the general formula:

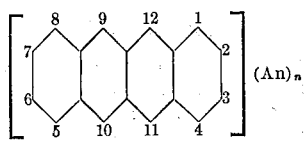

wherein a sulfur atom is fixed to each of the carbon atoms of the tetracenic nucleus numbered 9-10-11 and 12, and An stands for an anion, $n$ being one of the integers 1 and 2.

6. The method for coloring textile fibers selected from the group consisting of cellulose and regenerated cellulose, which consists in applying on said fibers in a non-alkaline medium, a basic dyestuff of the general formula:

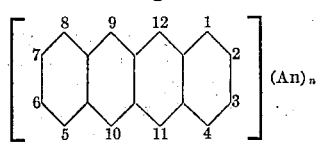

wherein a sulfur atom is fixed to each of the carbon atoms of the tetracenic nucleus numbered 9-10-11 and 12, and An stands for an anion, $n$ being one of the integers 1 and 2, and then in converting said soluble dyestuff into an insoluble pigment on said fibers.

7. The method for coloring textile fibers selected from the group consisting of cellulose and regenerated cellulose, which consists in applying on said fibers in a non-alkaline medium, a basic dyestuff of the general formula:

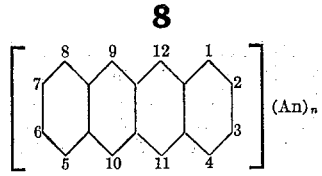

wherein a sulfur atom is fixed to each of the carbon atoms of the tetracenic nucleus numbered 9-10-11 and 12, and An stands for an anion, $n$ being one of the integers 1 and 2, and then in converting said soluble dyestuff into an insoluble pigment on said fibers by subjecting the latter to the combined action of water and heat.

8. The method for coloring textile fibers selected from the group consisting of cellulose and regenerated cellulose, which consists in applying on said fibers, in a non-alkaline medium, a basic dyestuff of the general formula:

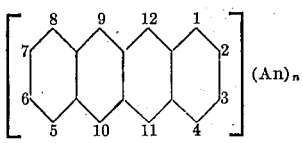

wherein a sulfur atom is fixed to each of the carbon atoms of the tetracenic nucleus numbered 9-10-11 and 12, and An stands for an anion, $n$ being one of the integers 1 and 2, and then in converting said soluble dyestuff into an insoluble pigment on said fibers by subjecting the latter to the combined action of water, heat and an alkaline agent.

9. The method for coloring textile fibers selected from the group consisting of cellulose and regenerated cellulose, which consists in applying on said fibers, in a non-alkaline medium, a basic dyestuff of the general formula:

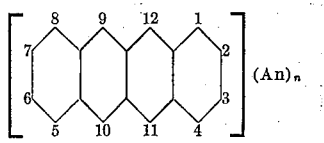

wherein a sulfur atom is fixed to each of the carbon atoms of the tetracenic nucleus numbered 9-10-11 and 12, and An stands for an anion, $n$ being one of the integers 1 and 2, and then converting said soluble dyestuff into an insoluble pigment on said fibers by subjecting the latter to a treatment with a reducing agent.

CHARLES MARSCHALK.
JEAN PAUL NIEDERHAUSER.

REFERENCES CITED

The following references are of record in the file of this patent:

UNITED STATES PATENTS

| Number | Name | Date |
|---|---|---|
| 1,358,490 | Wyler | Nov. 9, 1920 |
| 1,496,085 | Dziewonski | June 3, 1924 |
| 2,076,144 | Hagge et al. | Apr. 6, 1937 |
| 2,222,482 | Hagge et al. | Nov. 19, 1940 |

FOREIGN PATENTS

| Number | Country | Date |
|---|---|---|
| 468,627 | Great Britain | of 1936 |
| 431,976 | Great Britain | of 1934 |

OTHER REFERENCES

Postovskii et al.: Chemical Abstracts, vol. 35, p. 6589 (1941).

Marschalk: Bull. Soc. Chem. (France), 1939, vol. 6, pp. 931-932; 1122-1125. (Copy in Scientific Library.)